(12) United States Patent
Bertani

(10) Patent No.: US 11,702,967 B2
(45) Date of Patent: Jul. 18, 2023

(54) VENTING CAP WITH SPLASH GUARD

(71) Applicant: ELESA S.p.A., Milan (IT)

(72) Inventor: Alberto Bertani, Milan (IT)

(73) Assignee: ELESA S.P.A., Milan (IT)

(*) Notice: Subject to any disclaimer, the term of this patent is extended or adjusted under 35 U.S.C. 154(b) by 0 days.

(21) Appl. No.: 17/649,616

(22) Filed: Feb. 1, 2022

(65) Prior Publication Data

US 2022/0243624 A1 Aug. 4, 2022

(30) Foreign Application Priority Data

Feb. 3, 2021 (IT) .................. 102021000002381

(51) Int. Cl.
*F01M 11/12* (2006.01)

(52) U.S. Cl.
CPC .................................. *F01M 11/12* (2013.01)

(58) Field of Classification Search
CPC ...................................................... F01M 11/12
See application file for complete search history.

(56) References Cited

U.S. PATENT DOCUMENTS

| 4,031,294 A * | 6/1977 | Sano ...................... H01M 50/35 |
| | | 429/82 |
| 4,392,584 A * | 7/1983 | Bauer ................. B65D 51/1611 |
| | | 220/373 |
| 5,205,848 A * | 4/1993 | Blanc ..................... F01M 13/04 |
| | | 55/498 |
| 5,730,183 A * | 3/1998 | Kremsler ................ F16K 24/00 |
| | | 137/853 |
| 7,678,169 B1 | 3/2010 | Gwin et al. |
| 7,959,026 B2 * | 6/2011 | Bertani ................... F16K 24/04 |
| | | 215/370 |
| 9,867,975 B2 * | 1/2018 | Gardner ................ A61M 39/20 |
| 10,166,381 B2 * | 1/2019 | Gardner ................ A61M 39/20 |
| 2016/0273422 A1 | 9/2016 | Matsumoto |

FOREIGN PATENT DOCUMENTS

| GB | 2376460 A | 12/2002 |
| GB | 2434362 A | 7/2007 |
| JP | 2000038039 A * | 2/2000 |

OTHER PUBLICATIONS

Search Report for Italian Application No. 2021000002381 dated Nov. 24, 2021.

* cited by examiner

*Primary Examiner* — Kurt Philip Liethen
(74) *Attorney, Agent, or Firm* — Pearne & Gordon LLP

(57) ABSTRACT

The application relates to a venting cap for oil tanks of machines and machinery, including: a cup fitted with a flange along its outer surface, with this flange bearing coupling elements underneath it with complementary elements provided on the access sleeve of the tanks and at the top of shaped engagement tabs, a lid for closing the cup that is snap-fitted onto the cup, fitted with a flange, wherein: the flanged partition houses on its lower surface an insert with a substantially cylindrical profile, the cup body is associated with a spiral labyrinth on top of which is fitted the means for engaging the cup; and above the flange of the cup there is a collar fitted with an external toroidal groove that engages with a raised toroidal thread along the inner surface of an upper closing lid of the cup.

8 Claims, 2 Drawing Sheets

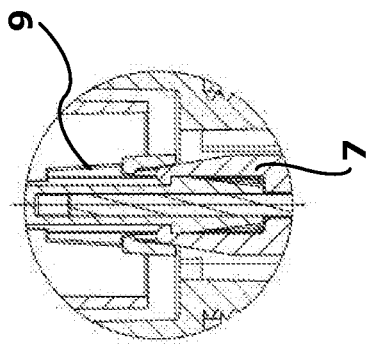
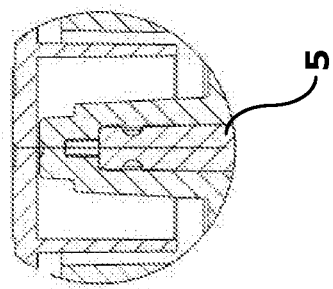
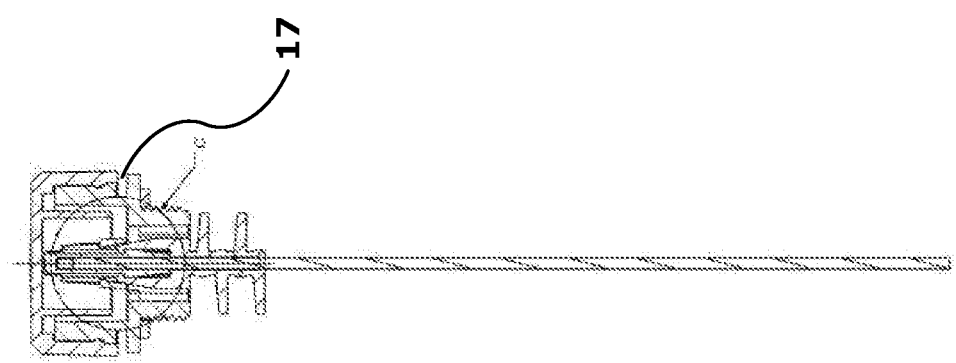
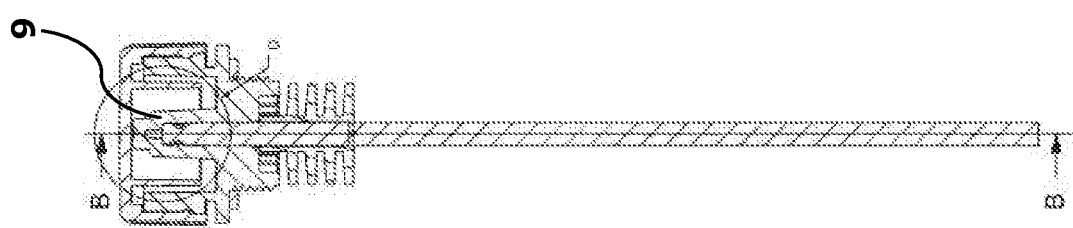
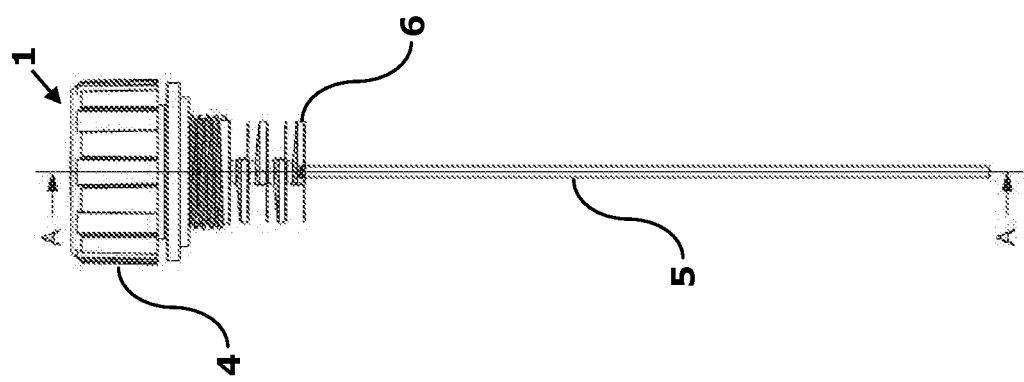

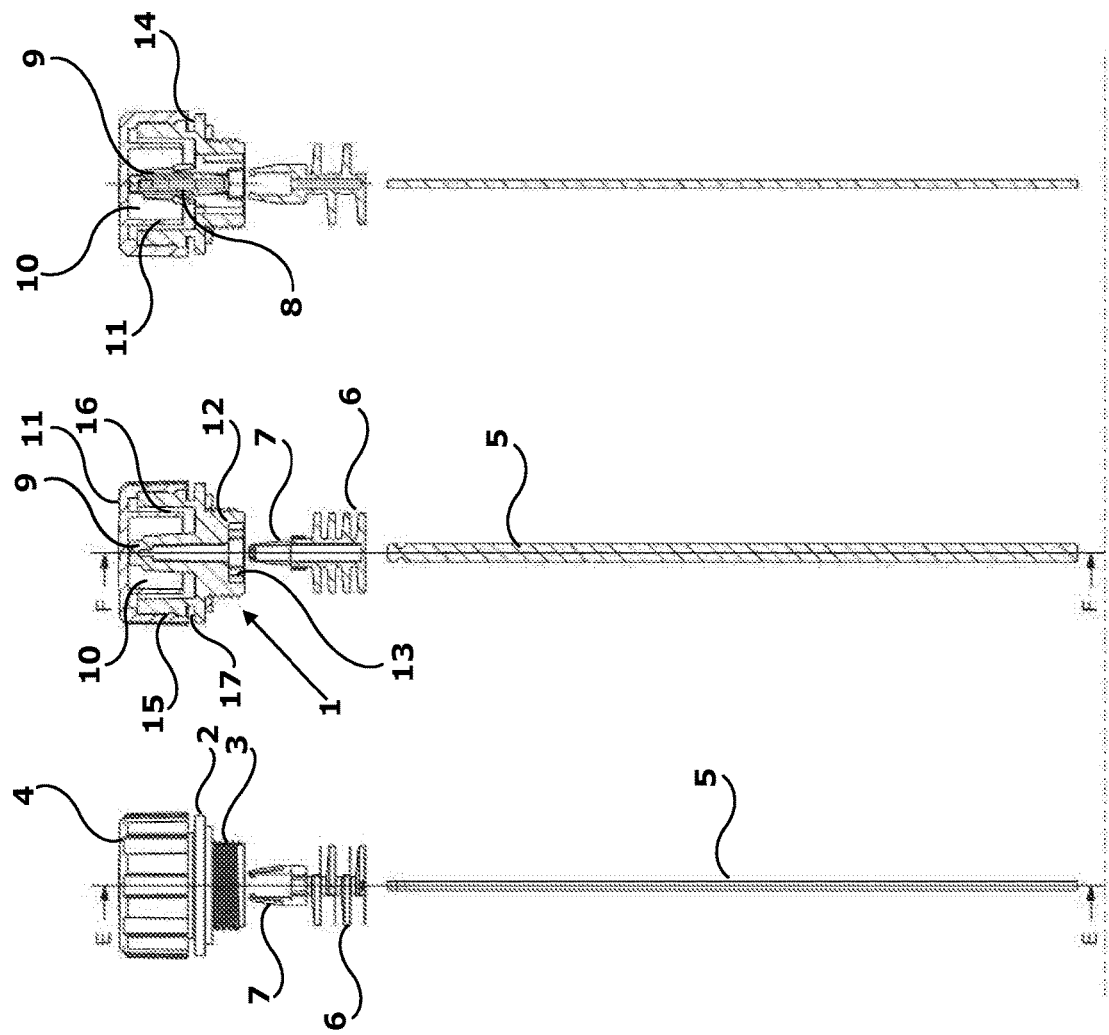

VENTING CAP WITH SPLASH GUARD

CROSS-REFERENCE TO RELATED APPLICATIONS

This application claims the benefit of Italian Application No. 102021000002381, filed Feb. 3, 2021, the entire disclosure of which is hereby incorporated herein by reference.

FIELD OF THE INVENTION

The present invention concerns a venting cap for oil tanks of machines, machinery, and similar.

BACKGROUND OF THE INVENTION

It has long been the practice on certain types of machines and machinery to provide caps on the filler pipe of oil tanks that make it possible to keep the pressure inside the tank the same as that outside, which are known as venting caps. This type of filler cap allows the vapours formed within the oil tanks to escape freely, which significantly reduces the formation of condensation due to the entry of damp air into the tanks themselves.

Furthermore, this type of cap ensures that there are no underpressures or overpressures that could damage the sealing gaskets and/or the other parts that are located inside the tank.

However, since the oil in the tanks fitted on machines is often subjected to violent agitation, and is hence easily sprayed against the walls of the tanks and consequently against the venting caps, it can easily happen that—albeit small—quantities of oil can seep out from the filler cap, causing leaks that are potentially hazardous for the environmental damage they can cause, as well as damage to the machinery of which the tanks are an integral part. Moreover, these leaks in any case comprehensibly reduce the quantity of oil present in the tank, with the risk that the residual quantity is no longer sufficient for the intended functions, and so it is possible that moving parts may be damaged.

Various methods have been devised for providing venting caps with equipment designed to contain or deviate the leaking oil. In particular, Italian utility model no. 173.511 in the name of the same Applicant relates to a venting cap consisting simply of a screw-in cup with a snap-fitted cover affixed to it and integral to its rotation, which is equipped with two splash guard diaphragms on the upper part of the cup, opposite each other in their position and inclination, and a porous filter located at the top of the cup chamber, to selectively filter the water and oil vapours. The splash guard diaphragms also have a rib that supports a dipstick.

In addition, Italian utility model 265.711 is intended to protect a venting cap for oil tanks of machines and machinery, and it consists of the association of a cup and a lid affixed to the top of the cup which is snap-fitted to it, in which the lid has at least two cylindrical diaphragms that, in cooperation with the cup, constitute a labyrinth system that allows only vapours and air to pass.

The solutions described and protected certainly solve the problems of managing oil dripping out of the tank, but at present they are rather difficult to implement, with construction that is far from trivial: they are in fact composed of two semi-finished products that must be assembled before being sold, entailing a significant disadvantage for the manufacturer.

It has hence become necessary to create a simple, streamlined structure that allows the operator to reduce the complexity of construction, storage, and assembly, while maintaining the sealing function of the liquid inside the tank constant.

BRIEF SUMMARY OF THE INVENTION

Object of the invention, hence, is to provide a splash guard filler cap fitted with a dipstick that is easy to manufacture, practical to store, and can be rapidly assembled at the time of use.

This object is achieved by means of a venting cap for machine and machinery oil tanks, comprising:
a cup fitted with a flange along its outer surface, with said flange bearing coupling elements underneath it with complementary elements provided on the access sleeve of said tanks and at the top of shaped engagement tabs,
a lid for closing said cup that is snap-fitted onto said cup, fitted with a flange
characterized in that:
said flanged partition houses on its lower surface an insert with a substantially cylindrical profile,
said cup body is associated with a spiral labyrinth on top of which is fitted the means for engaging said cup.
above said flange of said cup there is a collar provided with an external toroidal groove that engages with a raised toroidal thread along the inner surface of an upper closing lid of said cup.

BRIEF DESCRIPTION OF THE DRAWINGS

Here below is the description of the cap according to the model, referring to a particular variant thereof, as is depicted in the pictures, in which:
FIG. 1 is the front view of the invention, of which
FIG. 2 is the sectional view along the line A-A of FIG. 1 and FIG. 3 is the sectional view along the line B-B of FIG. 2;
FIG. 4 is the view of detail X of FIG. 3;
FIG. 5 is the view of detail Y of FIG. 2;
FIG. 6 is an exploded lateral view of a first embodiment of the cap according to the invention, of which
FIG. 7 is an axial sectional view along the line E-E of FIG. 6;
FIG. 8 is a view similar to FIG. 2, in axial section along the line F-F of FIG. 7.

DESCRIPTION OF EXAMPLE EMBODIMENTS

According to the first embodiment, the cap comprises a cup 1 which has a substantially cylindrical shape, approximately half-way up which there is a flanged longitudinal partition 2, beneath which there is a threaded portion 3 which engages with the upper extremity of the tank filler pipe (not shown) at the top of the shaped engagement tabs. Above said cup there is a cover 4.

A dipstick 5 is connected to said cup 1, on top of which there is a spiral labyrinth 6 that has a prong 7 on its upper part.

Internally, the cup 1 is made up of a cylindrical body divided longitudinally about half-way up by said flanged partition 2, which has a central hole 8. In correspondence with said central hole 8 there is an insert 9 for housing the top portion of the dipstick 5 and engagement with said prong 7, said insert 9 coming into contact with the inner surface of the cap base 4.

In particular, said coupling 9 comprises a cylindrical body, which is hollow on the inside and has tapered internal walls. Externally, the coupling 9 has a lower groove for housing said prong 7 and an upper groove for housing the means of engagement affixed integrally to the aforesaid cup 1.

Typically, the prong 7 and the means of engagement of said cup are constituted by a highly elastic element, so as to be able to snap on to and engage with the cup 1, integrating itself with it.

In the upper portion, the cup 1 constitutes a chamber 10 bordered laterally by a cylindrical wall 11, and below by the flanged partition 8, and centrally by the insert 9.

In the lower portion, the exterior of the cup 1 has a thread 3, and a radial partition 12, the bottom surface of which bears a cavity 13 that acts as an abutment for the labyrinth 6.

The engagement between the lid 4 and the cup 1 occurs thanks to the presence of a collar 14 equipped with an external toroidal groove 15 for engagement with a raised toroidal thread 16 provided along the inner surface of an upper closing lid of said cup 1.

Between the flange 2 and the collar 14, there is a groove 17, which favours the passage of air in both directions, between the tank and the external environment.

To allow the correct positioning of the dipstick with respect to the body of the cap, the labyrinth 6 is centrally perforated, in such a way that the extremity of the dipstick can fit correctly inside the insert 9.

In the second embodiment, the cap assembly is substantially identical to the one described so far, with the exception of the fact that no dipstick is envisaged: the splash guard 6 is directly connected to the cup.

The structure made in this way is relatively simple to construct; given that it comprises single pieces that do not require processing in the production phase, the assembly can be carried out rapidly, adapting the product to the requirements of the end user. In particular, it will be understood from what is reported below as regards the assembly, that—whichever embodiment is selected—the protected solution can be easily assembled also by the purchaser before application to the tank.

Assembly is relatively simple: the operator takes care to bring the lid 4 into mutual engagement with the cup 1, and to bring the labyrinth 6 and the dipstick 5 into engagement with the cup 1. In particular, the labyrinth 6 fits within the cavity 13, while the dipstick 5 is positioned within the insert 9. If necessary, it is possible to arrange for the association between the labyrinth 6 and the dipstick 5 before positioning the assembly inside the cup 1. In order to ensuring that the dipstick 5 is correctly held in position, it can be shaped with two semi-circular notches at one end, which is opportunely brought inside said insert 9, so that it interferes with it, causing a slight deformation of the internal surface of said insert 9, forming an undercut.

Thus assembled, the whole unit is then brought into engagement with the filler pipe of the tank, in accordance with well-known methods.

Thus, a cap assembly is achieved which is arranged with a labyrinth inside it and at the same time with an external spiral labyrinth, arranged in such a way as to be an appendage of the cup-shaped body which constitutes the main and original component of the labyrinth inside the cap. The interchangeability of the external splash guard element with or without a dipstick means it is possible to make the entire product even more versatile.

In the same way, although it is more complex than existing ones, the labyrinth structure allows the vapours to escape through the loops of the labyrinth, which have a cooling function that causes condensation, with the consequent formation of droplets that drip back into the chamber beneath.

In this way, the sealing of the cap and the cleanliness of the machinery is guaranteed, maintaining the desired properties of a device that is easy to manufacture and which has a much longer working life than currently available caps.

It appears evident that the main purpose of the invention has thus been achieved, namely a cap system that is easy to manufacture and which still maintains excellent sealing properties.

It is understood that the solutions described above are only some of the possible embodiments of this invention, and that there may be several variants that lie within the scope of protection defined by the attached claims.

In particular, it is also possible to provide a cap that includes a cup housing a dipstick, the two semi-circular notches of the dipstick making interference with the internal surface of the insert provided in the cup with the consequent slight deformation of its internal surface and the creation of an undercut.

The invention claimed is:

1. Venting cap for oil tanks of machines and machinery, comprising:
    a cup that is fitted with a flange along its outer surface,
        with said flange bearing coupling elements being provided on an underside of the flange, with complementary elements provided on the access sleeve of said tanks and at the top of shaped engagement tabs,
        wherein the cup houses an insert secured therein with a substantially cylindrical profile,
        wherein a lower surface of the cup comprises a cavity;
    a splash guard, comprising a spiral labyrinth, that is partially received within the cavity,
        wherein an upper portion of the spiral labyrinth has a means for engaging the insert within the cup, comprising an elastic prong, and
        wherein a lower portion of the spiral labyrinth is located below the flange and external to the cup;
    a lid for closing the cup,
        wherein the lid is configured to be snap-fitted onto the cup,
        wherein a collar is located above the flange of the cup, the collar having an external toroidal groove,
            the external toroidal groove being configured to engage with a raised toroidal thread along an inner surface of the lid to thereby snap-fit the lid onto the cup.

2. The venting cap for oil tanks of machines and machinery of claim 1, wherein said cup constitutes, above said flange, a chamber bordered laterally by a cylindrical wall and centrally by said insert.

3. The venting cap for oil tanks of machines and machinery of claim 1, wherein said cup, beneath said flange, is externally provided with a male thread, and is hollow internally, except for a radial partition, a bottom surface of which bears a cavity that acts as an abutment for said spiral labyrinth.

4. The venting cap for oil tanks of machines and machinery of claim 1, wherein said spiral labyrinth is hollow in its centre so as to accommodate an upper portion of a dipstick.

5. The venting cap of claim 1, wherein said insert is comprised of a hollow cylindrical body having on its external surface at least two engagement grooves respectively engaging with said prong of said spiral labyrinth.

6. The venting cap of claim 5, wherein said insert has a grooved internal surface.

7. The venting cap of claim 4, wherein said dipstick is held in stable engagement within the internal cavity of said insert.

8. The venting cap of claim 1, wherein said prong and said insert are engaged by snap-action elements.

\* \* \* \* \*